June 2, 1970     D. K. HERBERT ET AL     3,514,908

PROCESS FOR FINISHING CONTACT LENSES

Filed Nov. 29, 1967     4 Sheets-Sheet 1

DOUGLAS K. HERBERT
KENNETH R. GILL
        INVENTORS

BY *Frank C. Parke*

ATTORNEY

DOUGLAS K. HERBERT
KENNETH R. GILL
INVENTORS

BY *Frank C. Parker*

ATTORNEY

DOUGLAS K. HERBERT
KENNETH R. GILL
INVENTORS

BY Frank C. Parker

ATTORNEY

DOUGLAS K. HERBERT
KENNETH R. GILL
INVENTORS

BY

ATTORNEY

United States Patent Office 3,514,908
Patented June 2, 1970

3,514,908
PROCESS FOR FINISHING CONTACT LENSES
Douglas K. Herbert, Glen Mills, Pa., and Kenneth R. Gill, Rochester, N.Y., assignors to Bausch & Lomb Incorporated, Rochester, N.Y., a corporation of New York
Filed Nov. 29, 1967, Ser. No. 686,568
Int. Cl. B24b 1/00
U.S. Cl. 51—284                    5 Claims

ABSTRACT OF THE DISCLOSURE

An improved process for finishing the edge of a contact lens. In particular the process is applicable for finishing the edges of contact lenses manufactured by spin casting cross-linked hydrophilic polymers.

BACKGROUND OF THE INVENTION

This invention relates to an improved process for finishing the outer peripheral edge of a contact lens.

Contact lenses manufactured from cross-linked hydrophilic polymers such as disclosed in U.S. Pat. 3,220,960 granted to O. Wichterle are being introduced for use in vision correction because of their ability to remain soft when in contact with the eye. The softness of the lens helps to alleviate problems of eye discomfort commonly associated with well-known hard contact lenses. The softening of the lens takes place by absorption of water into the lens material.

One method of manufacturing the soft lens is by a process of spin casting a predetermined amount of the monomer in a lens mold and thereafter maintaining the formed lens in an aqueous solution to retain its softness. Due to the fact that there is a definite volume change in the lens caused by the absorption of the water it is necessary to measure the lens and examine the lens for defects in its soft condition. However, should it become necessary to correct edge defects, as are commonly found in spun cast lenses, the lens must be dried for such corrective procedures. In the dry state the lens is rigid and can be readily subjected to corrective measures.

One method of working on the hydrophilic contact lenses has been by drying the lens after flattening between suitable holding devices such as glass plates and thereafter polishing or grinding the lens to correct edge defects. This method is less than desirable because when the lens is flattened prior to drying it does not retain a circular configuration, making it difficult to provide an even surface at the outer periphery of the lens.

SUMMARY OF THE INVENTION

To avoid the above described problems and to, in general, provide an improved process for finishing contact lenses we have devised an improved finishing process wherein the lens is dried while maintaining its general sphero convex shape. The lens is then mounted on a suitable holding means and further rotated about a central axis while suitable abrasives are applied to the outer periphery of the dried lens to finish the edge. A further feature resides in thereafter cleaning the lens and separating the lens from the lens holding means with a minimum of handling.

Although this process may be used for other types of contact lenses it is particularly suitable for finishing the aforementioned lenses manufactured from cross-linked hydrophilic polymers.

Accordingly it is the primary object of this invention to provide a process for finishing the peripheral edge of a contact lens.

It is a further object of the present invention to provide a process for finishing the edge of a contact lens manufactured from cross-linked hydrophilic polymers while maintaining the general sphero-convex shape of the lens during the finishing operation.

It is still another object of the present invention to provide a process for uniformly finishing the outer peripheral edge of a contact lens.

DESCRIPTION OF THE PREFERRED EMBODIMENTS

Figure 1:
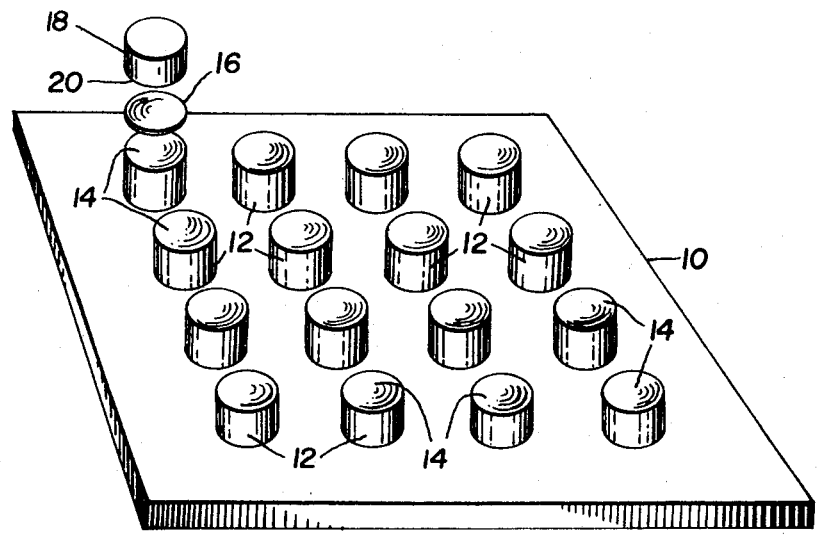
FIG. 1 is a perspective view of an apparatus for holding the contact lens during the drying step.

Referring now to the drawings the process of the present invention has for its first step the drying of the contact lens while maintaining its generally sphero-convex shape.

FIG. 1 shows one form of the drying apparatus comprising a base 10, a plurality of vertical lens holding means 12 mounted on the base 10 and having on the upper-most surfaces 14 a generally sphero-convex radius. The radius of surface 14 has been determined to be approximately 7.80 millimeters for use with the general variety of contact lenses produced. For convenience a single contact lens 16 is shown in FIG. 1 being placed upon the lens holding member 12 with the sphero-concave surface of the lens placed on surface 14 of member 12. A plurality of top or cover members 18 are also provided for holding the lens 16 in its generally sphero convex shape during drying. The members 18 (only one is shown here for convenience) have a bottom surface 20 of generally sphero-concave shape complementary to surface 14 of member 12. The member 18 is generally fabricated from the same material as member 12 and need not be excessively large in order to prevent the lens from wrinkling during the drying step.

Figure 2:
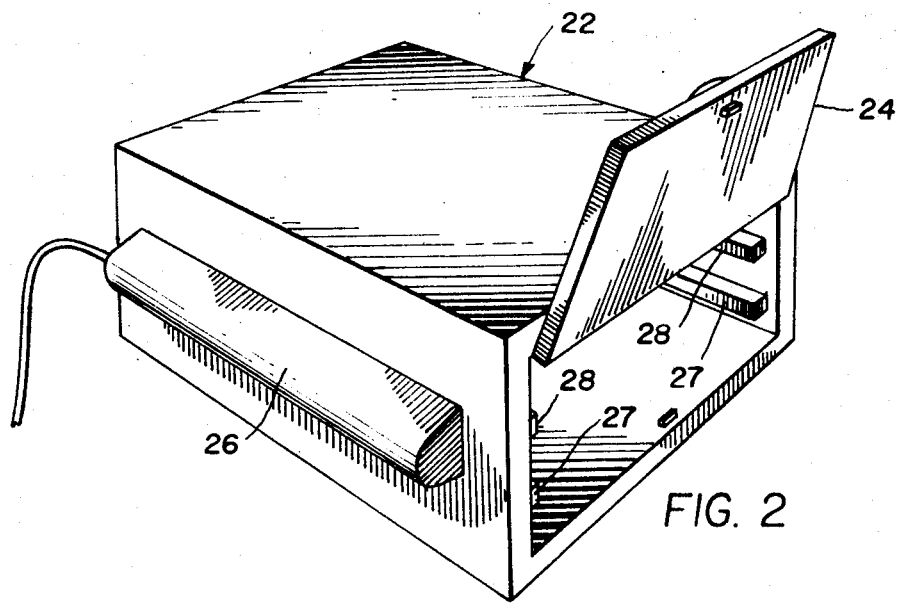
FIG. 2 is a perspective view of the apparatus of the second step of the invention.

Shown in FIG. 2 is one type of drying apparatus generally designated 22 comprising a box like configuration with a door 24, heating means 26 and holding members 27—27, 28—28. The base 10 with the lenses 16 and top members 18 in place may be placed upon holding means 27—27 or 28—28 and the door 24 closed. The heating element 26 is then activated to heat the apparatus 22. We have found that temperatures of approximately 90 to 110° F. for periods from 4 to 12 hours are adequate for drying contact lenses.

Figure 3:
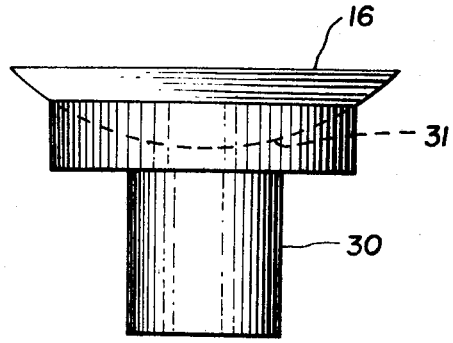
FIG. 3 is an elevational view of the lens holding means.

Subsequent to the drying operations the rigid lenses are placed in a lens holding device 30 as shown in FIG. 3. The lens 16 is centered in the holding device 30 and adhered along the surface 31 of the lens holding device by means of tape with adhesive on both sides. The lens holding device 30 is commonly referred to as a lens block or lens blocking device when used in connection with hard contact lenses or glass ophthalmic lenses.

Figure 4:
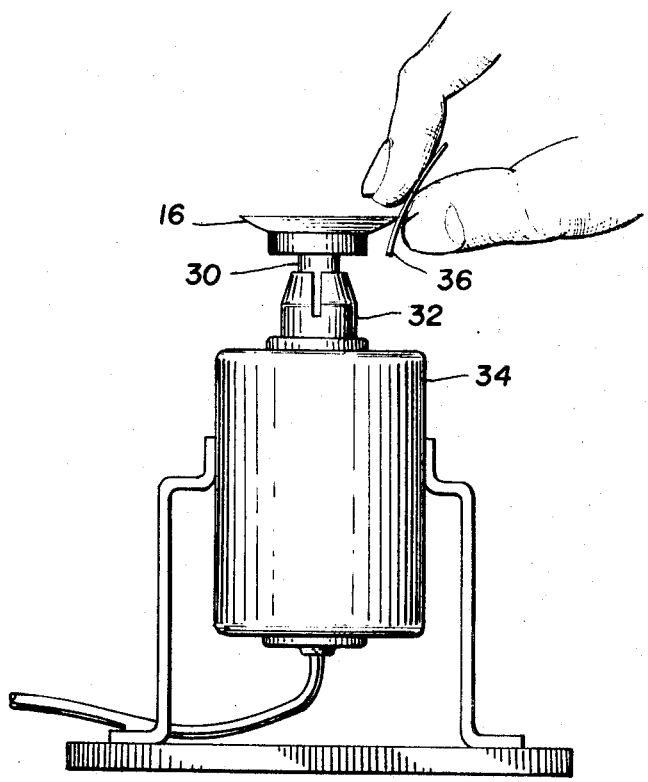
FIG. 4 is an elevational view of the edge finishing step of the present invention.
Figure 5:
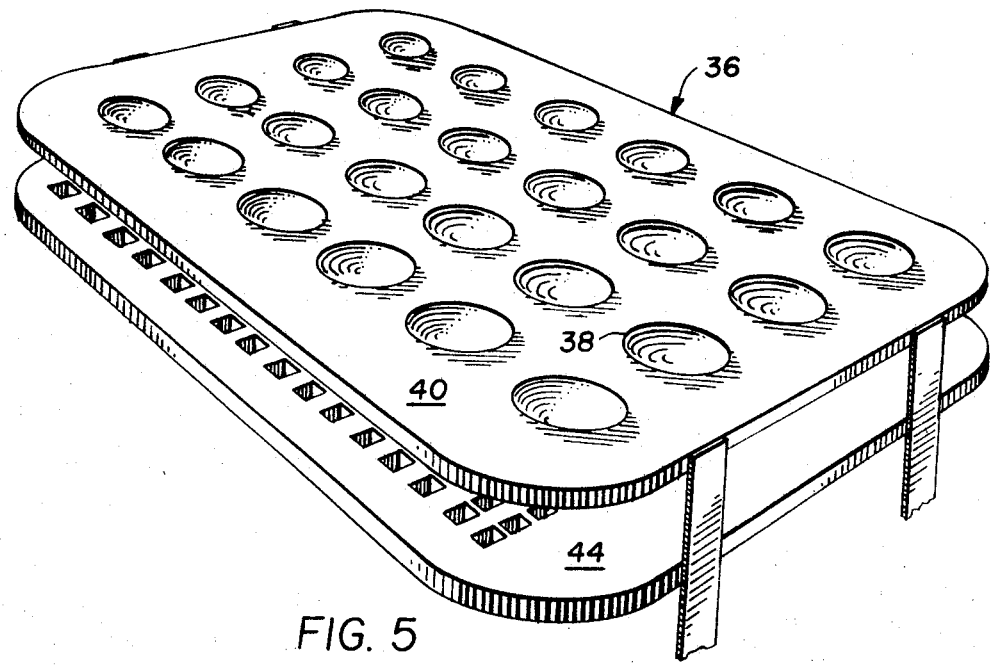
FIG. 5 is a perspective view of the cleaning fixture.
Figure 6:
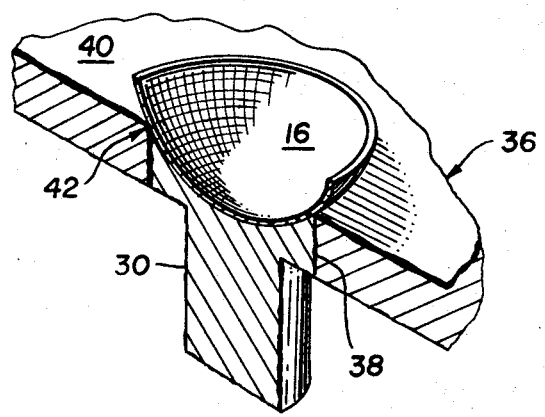
FIG. 6 is a fragmentary sectional view of a lens mounted in the apparatus of FIGURE 5.

As shown in FIG. 4 the lens and holding device are then mounted in a chuck 32 of rotational device 34. The rotational device 34 can be small electrical motor and in fact it has been found that a 1/60 horsepower motor providing 1600 revolutions per minute is perfectly satisfactory. After the lens and mounting device are securely fastened to the chuck 32 of the motor 34 the motor is turned on. As the first step in the finishing operation a piece of fine emery 36 is held against the edge of the lens to remove gross irregularities. We have found a No. 727 dental emery disk to be satisfactory for this purpose when held against the lens for between 10 and 20 seconds. After the application of the emery disk 36 to the edge of the lens a polishing compound is applied to the edge by use of a cotton swab or other similar device for between 10 and 20 seconds. A polishing compound consisting of a mixture of tin oxide and kerosene made to the consistency of a paste has worked consistently with excellent results. The lens 16 and lens block 30 are then removed from the chuck 32 and placed into one of the apertures 38 in the holding device shown generally as 36 in FIG. 5. The apertures 38 of fixture 36 are slightly larger in diameter than the diameter of the upper part of the lens holding device 30, in order that the lens 16 is in contact with surface 40 of fixture 36. As shown in FIG. 6 the lens 16 makes contact with the surface 40 on its sphero-convex surface at the upper-most edge 42 of aperture 38.

Figure 7:
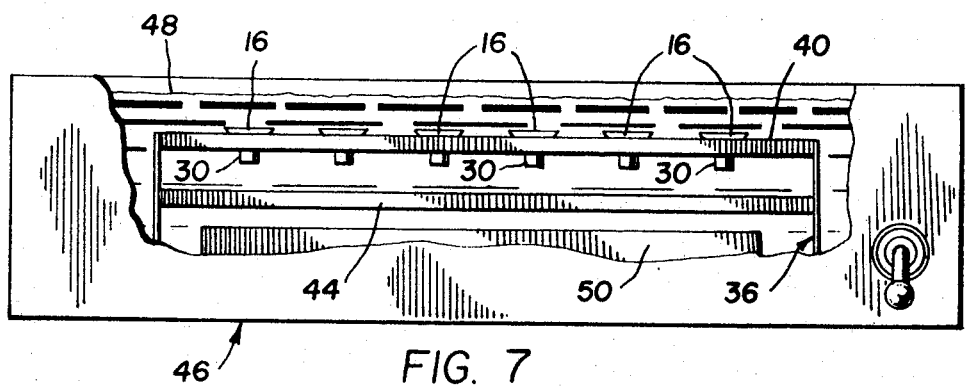
FIG. 7 is a fragmentary elevational view of the cleaning step of the present invention.

The fixture 36 is placed into an ultrasonic generator 46 (FIG. 7) containing a quantity of hexane 48 sufficient in depth to immerse the fixture 36 and the lenses 16. The generators transducer 50 is then activated and the lenses are cleaned by the action of the generator and the solution. During the cleaning the action of the ultrasonic generator causes the lens blocking means 30 to separate from the lens and fall upon the bottom member 44 of fixture 36. The lenses remain on surface 40 and after the ultrasonic generator 46 is turned off the entire fixture 36 is lifted from the bath. At this time the lenses can be readily lifted from surface 40 and boiled in a saline solution for sterilization. After boiling, the lenses are then stored in a sterile saline solution until ready to be worn. During the boiling in the saline solution the lenses become rehydrated and are once again in the soft condition.

It is apparent from the foregoing description that the lenses may be finished to precise tolerances because the outer periphery of the lens is continuously maintained in a circular configuration during the finishing operation. It is further apparent that a minimum amount of handling of the lens is needed in order to do the required finishing operations.

Although only certain forms of the present invention are shown and described herein in detail, other forms are possible and changes may be made without departing from the spirit and scope of the invention as defined in the following claims.

What is claimed is:
1. A method for finishing the edge of a hydrophilic contact lens comprising,
   drying the contact lens,
   mounting said dried contact lens on a lens blocking means,
   mounting said blocked lens in a rotational device and rotating the lens,
   contacting the edge of the lens with abrasive means during rotation, and
   ultrasonically removing said lens from said lens block and simultaneously cleaning said lens.
2. A method for finishing the circumferential edge of a hydrophilic contact lens comprising,
   placing said lens in shape retaining means,
   drying said lens in said shape retaining means,
   mounting said dried lens on a lens blocking means,
   mounting said blocked lens in a rotational device and rotating said lens,
   contacting the edge of said lens with abrasive means during rotation, and, thereafter,
   removing said lens from said blocking means and cleaning said lens.
3. The method in accordance with claim 2 wherein the lens is exposed to a temperature of between 90 and 110° F. during the drying operation.
4. The method in accordance with claim 2 wherein the abrasives used for finishing the edge of the lens include fine emery paper and a tin oxide-kerosene paste.
5. The method in accordance with claim 2 wherein the removal of the lens from the lens blocking means and the cleaning of the lens are carried out simultaneously in an ultrasonic generator containing a bath of hexane.

References Cited

UNITED STATES PATENTS

| 3,112,581 | 12/1963 | Hoffman | 51—284 X |
| 3,145,506 | 8/1964 | Vegors et al. | 51—284 X |
| 3,220,960 | 11/1965 | Wichterle | 260—2.5 |
| 3,238,676 | 3/1966 | Borish | 51—284 |
| 3,369,329 | 2/1968 | Beiman | 51—284 |

LESTER M. SWINGLE, Primary Examiner

U.S. Cl. X.R.

51—323